US011196829B2

(12) United States Patent
Wang et al.

(10) Patent No.: US 11,196,829 B2
(45) Date of Patent: Dec. 7, 2021

(54) METHOD AND APPARATUS FOR PUSHING TARGET INFORMATION

(71) Applicant: TENCENT TECHNOLOGY (SHENZHEN) COMPANY LIMITED, Guangdong (CN)

(72) Inventors: Hui Wang, Shenzhen (CN); Li Liu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 688 days.

(21) Appl. No.: 14/971,844

(22) Filed: Dec. 16, 2015

(65) Prior Publication Data

US 2016/0105521 A1    Apr. 14, 2016

Related U.S. Application Data

(63) Continuation of application No. PCT/CN2015/072757, filed on Feb. 11, 2015.

(30) Foreign Application Priority Data

Mar. 7, 2014  (CN) .......................... 201410083179.1

(51) Int. Cl.
  *H04L 12/58*   (2006.01)
  *H04L 29/08*   (2006.01)
  *H04L 12/18*   (2006.01)

(52) U.S. Cl.
  CPC .......... *H04L 67/26* (2013.01); *H04L 12/1859* (2013.01); *H04L 51/14* (2013.01); *H04L 51/24* (2013.01)

(58) Field of Classification Search
  CPC ....................................................... H04L 67/26
  (Continued)

(56) References Cited

U.S. PATENT DOCUMENTS 6,314,451 B1 *  11/2001  Landsman ............. G06Q 30/02
                                                      709/203
8,526,982 B1    9/2013  Peris et al.
(Continued)

FOREIGN PATENT DOCUMENTS

CN    101123520 A    2/2008
CN    101520878 A    9/2009
(Continued)

OTHER PUBLICATIONS

International Search Report in international application No. PCT/CN2015/072757, dated May 18, 2015.
(Continued)

*Primary Examiner* — Suraj M Joshi
*Assistant Examiner* — Sherman Lin
(74) *Attorney, Agent, or Firm* — Crowell & Moring LLP

(57) ABSTRACT

A method and an apparatus for pushing target information belong to the field of Internet applications. The method includes: determining, according to target information, a user meeting a condition; determining, for each determined user, a target identifier of the target information and strength of interest of the user in the target information as a push task for the user; determining a push task having the greatest strength of interest or a push task whose strength of interest is greater than a predetermined strength threshold as a target push task; and pushing a target push message corresponding to the target push task to the user. In the present disclosure, a target push task is determined according to strength of interest of a user in a push task, a target push message is determined according to the target push task, and the target push message is pushed to the user.

17 Claims, 5 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,892,648 | B1* | 11/2014 | Durham | G06Q 50/01 709/204 |
| 2004/0236834 | A1 | 11/2004 | Kreitzer | |
| 2009/0013387 | A1 | 1/2009 | Paas | |
| 2009/0271611 | A1* | 10/2009 | Roll | H04L 63/104 713/150 |
| 2010/0049852 | A1* | 2/2010 | Whitnah | G06Q 10/10 709/226 |
| 2011/0173570 | A1* | 7/2011 | Moromisato | G06F 16/904 715/838 |
| 2012/0203831 | A1* | 8/2012 | Schoen | G06Q 10/10 709/204 |
| 2012/0309358 | A1* | 12/2012 | Gunawardena | H04W 88/04 455/412.1 |
| 2013/0031162 | A1* | 1/2013 | Willis | H04L 65/1069 709/203 |
| 2013/0173708 | A1* | 7/2013 | Wang | H04L 51/12 709/204 |
| 2013/0254290 | A1* | 9/2013 | Grossman | H04L 67/306 709/204 |
| 2013/0290503 | A1* | 10/2013 | Rajkumar | G06Q 30/0241 709/223 |
| 2013/0332523 | A1* | 12/2013 | Luu | G06Q 30/0251 709/204 |
| 2015/0249719 | A1 | 9/2015 | Wen et al. | |

FOREIGN PATENT DOCUMENTS

| | | |
|---|---|---|
| CN | 101547162 A | 9/2009 |
| CN | 101690121 A | 3/2010 |
| CN | 103177384 A | 6/2013 |
| CN | 103440259 A | 12/2013 |
| CN | 103618668 A | 3/2014 |
| JP | 2007201742 A | 8/2007 |
| JP | 2010103902 A | 5/2010 |
| JP | 2010522912 A | 7/2010 |
| KR | 20090133128 A | 12/2009 |
| WO | 2008119175 A1 | 10/2008 |
| WO | 2014015808 A1 | 1/2014 |

OTHER PUBLICATIONS

Written Opinion of the International Search Authority in international application No. PCT/CN2015/072757, dated May 18, 2015.
Supplementary European Search Report in European application No. 15759039.9, dated Nov. 16, 2016.
Notification of the First Office Action of Japanese application No. 2016-541606, dated Aug. 15, 2017.
Notification of the First Office Action of Chinese application No. 201410083179.1, dated Oct. 30, 2017.

* cited by examiner

METHOD AND APPARATUS FOR PUSHING TARGET INFORMATION

CROSS REFERENCE TO RELATED APPLICATIONS

This is a continuation application of International Patent Application No. PCT/CN2015/072757, filed on Feb. 11, 2015, which claims priority to Chinese Patent Application No. 201410083179.1 filed on Mar. 7, 2014, the disclosure of which is incorporated by reference herein in its entirety.

FIELD OF THE TECHNOLOGY

The present disclosure relates to the field of Internet applications, and more particularly to a method and an apparatus for pushing target information.

BACKGROUND OF THE DISCLOSURE

With the popularization of network applications, a user has developed a habit of acquiring information by using microblogging, and a product manufacturer therefore conceives of pushing target information of the product manufacturer to a user by using microblogging.

In a conventional process of pushing target information by using microblogging, a server first acquires, from a task list, target information that needs to be pushed, a user meeting the feature is selected according to a feature of a user to which the target information requires to be pushed, and the target information is placed in a push list of the user. Next, when the user meeting the feature is online, all target information that has not been pushed in the push list of the user is pushed to the user meeting the feature.

However, when a user logs in to a microblogging account to check a microblogging message, a lot of target information pushed by a server may be received one time. The user may only check first several pieces of target information and stop paying attention on more microblogging messages. In this case, a lot of target information that is in the back and is highly informative for the user may not reach the user, and therefore quality of delivery of such a method for pushing target information is not high enough.

SUMMARY

In view of this, embodiments of the present invention provide a method and an apparatus for pushing target information. The technical solutions are as follows:

An aspect provides a method for pushing target information, the method including:

determining, according to target information, a user meeting a condition, the user having a right to receive the target information pushed by a push user;

determining, for each determined user, a target identifier of the target information and strength of interest of the user in the target information as a push task for the user;

determining a push task having the greatest strength of interest or a push task whose strength of interest is greater than a predetermined strength threshold as a target push task; and pushing a target push message corresponding to the target push task to the user, the target push message including target information corresponding to a target identifier of the target push task and the push user pushing the target information.

Another aspect provides an apparatus for pushing target information, the apparatus including:

a first determination module, configured to determine, according to target information, a user meeting a condition, the user having a right to receive the target information pushed by a push user;

a second determination module, configured to determine, for each determined user, a target identifier of the target information and strength of interest of the user in the target information as a push task for the user;

a third determination module, configured to determine a push task having the greatest strength of interest or a push task whose strength of interest is greater than a predetermined strength threshold as a target push task; and a push module, configured to push a target push message corresponding to the target push task to the user, the target push message including target information corresponding to a target identifier of the target push task and the push user pushing the target information.

Another aspect further provides a permanent computer readable store medium, stored with computer executable instructions thereon, these executable instructions, when being run on a server, executing a method for pushing target information, and the method including:

determining, according to target information, a user meeting a condition, the user having a right to receive the target information pushed by a push user;

determining, for each determined user, a target identifier of the target information and strength of interest of the user in the target information as a push task for the user;

determining a push task having the greatest strength of interest or a push task whose strength of interest is greater than a predetermined strength threshold as a target push task; and pushing a target push message corresponding to the target push task to the user, the target push message including target information corresponding to a target identifier of the target push task and the push user pushing the target information.

In a push to a user, a target push task is determined according to strength of interest of the user in a push task, a target push message is determined according to the target push task, and the target push message is pushed to the user; a problem of insufficiently high push quality of pushing target information in existing technologies is solved; during acquisition of the target push task, according to strength of interest of the user, the target push task having the greatest strength of interest or having strength of interest greater than a predetermined strength threshold may be selected; therefore, a push amount is significantly reduced, it is ensured that a push message pushed to the user is content in which the user is relatively interested, and an effect of improving push quality is achieved.

BRIEF DESCRIPTION OF THE DRAWINGS

To describe the technical solutions of the embodiments of the present invention more clearly, the accompanying drawings for illustrating the embodiments will be introduced briefly in the following. Apparently, the accompanying drawings in the following description are only some embodiments of the present application, and a person of ordinary skill in the art may obtain other drawings based on these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

Figure 1:
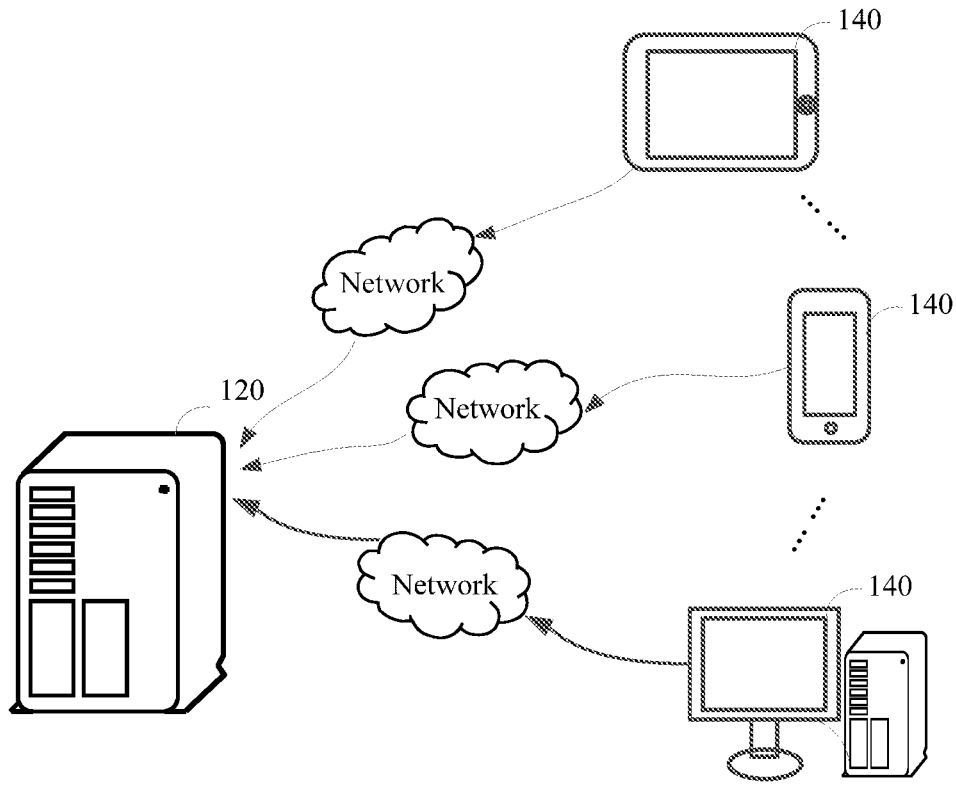
FIG. 1 is a schematic diagram of an implementation environment involved in a method for pushing target information according to an embodiment of the present invention.

FIG. 1 is a schematic diagram of an implementation environment involved in a method for pushing target information according to an embodiment of the present invention. The implementation environment may include a server 120 and at least one terminal 140, and the server 120 is separately connected to each terminal 140 in a wired network manner or a wireless network manner.

The server 120 may be one server, or a server cluster formed of several servers, or is a cloud computing service center. The server 120 may receive a request (for example, a request of logging in to a microblogging account, a request of refreshing microblogs) sent by each terminal 140, and save target information that needs to be pushed.

The terminal 140 may be an electronic device on which a client that can send a request to the server 120 is run. The electronic device may be a smart phone, tablet a computer, a smart TV, an e-reader, a Moving Picture Experts Group Audio Layer III (MP3) player, a Moving Picture Experts Group Audio Layer IV (MP4) player, a laptop computer, a desktop computer, and the like.

Figure 2:
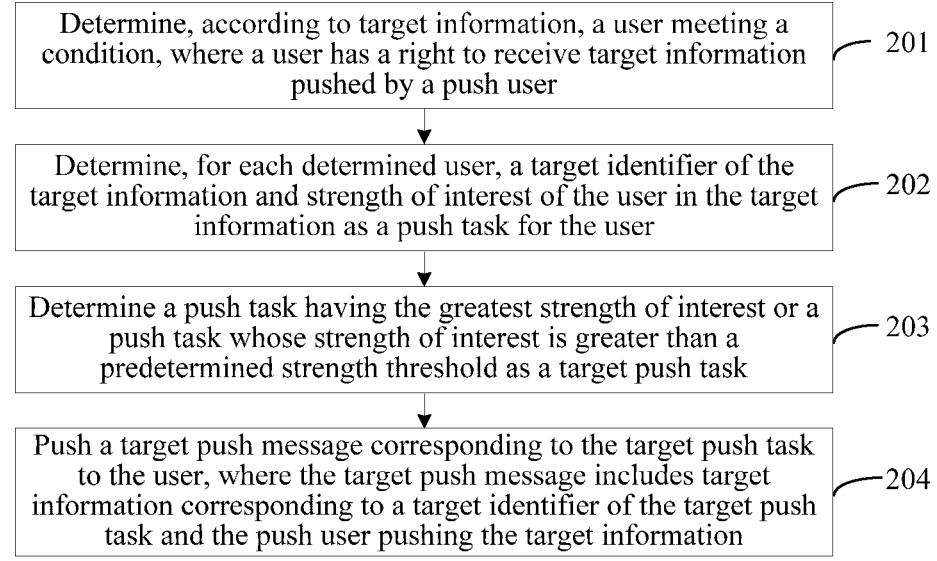
FIG. 2 a method flowchart of a method for pushing target information according to an embodiment of the present invention.

Referring to FIG. 2, FIG. 2 is a method flowchart of a method for pushing target information according to an embodiment of the present invention. The method for pushing target information is mainly described by using an example of the server 120 being applied in the implementation environment shown in FIG. 1. The method for pushing target information may include:

201: Determine, according to target information, at least one user meeting a condition, where the at least one user has a right to receive target information pushed by a push user.

202: Determine, for each determined user, a target identifier of the target information and strength of interest of the user in the target information as a push task for the user.

203: Determine a push task having the greatest strength of interest or a push task whose strength of interest is greater than a predetermined strength threshold as a target push task.

204: Push a target push message corresponding to the target push task to the user, where the target push message includes target information corresponding to a target identifier of the target push task and the push user pushing the target information.

In conclusion, in the method for pushing target information provided in the embodiment of the present invention, in a push to a user, a target push task is determined according to strength of interest of the user in a push task, a target push message is determined according to the target push task, and the target push message is pushed to the user; a problem of insufficiently high push quality of pushing target information in existing technologies is solved; during acquisition of the target push task, according to strength of interest of the user, the target push task having the greatest strength of interest or having strength of interest greater than a predetermined strength threshold may be selected; therefore, a push amount is significantly reduced, it is ensured that a push message pushed to the user is content in which the user is relatively interested, and an effect of improving push quality is achieved.

Figure 3A:
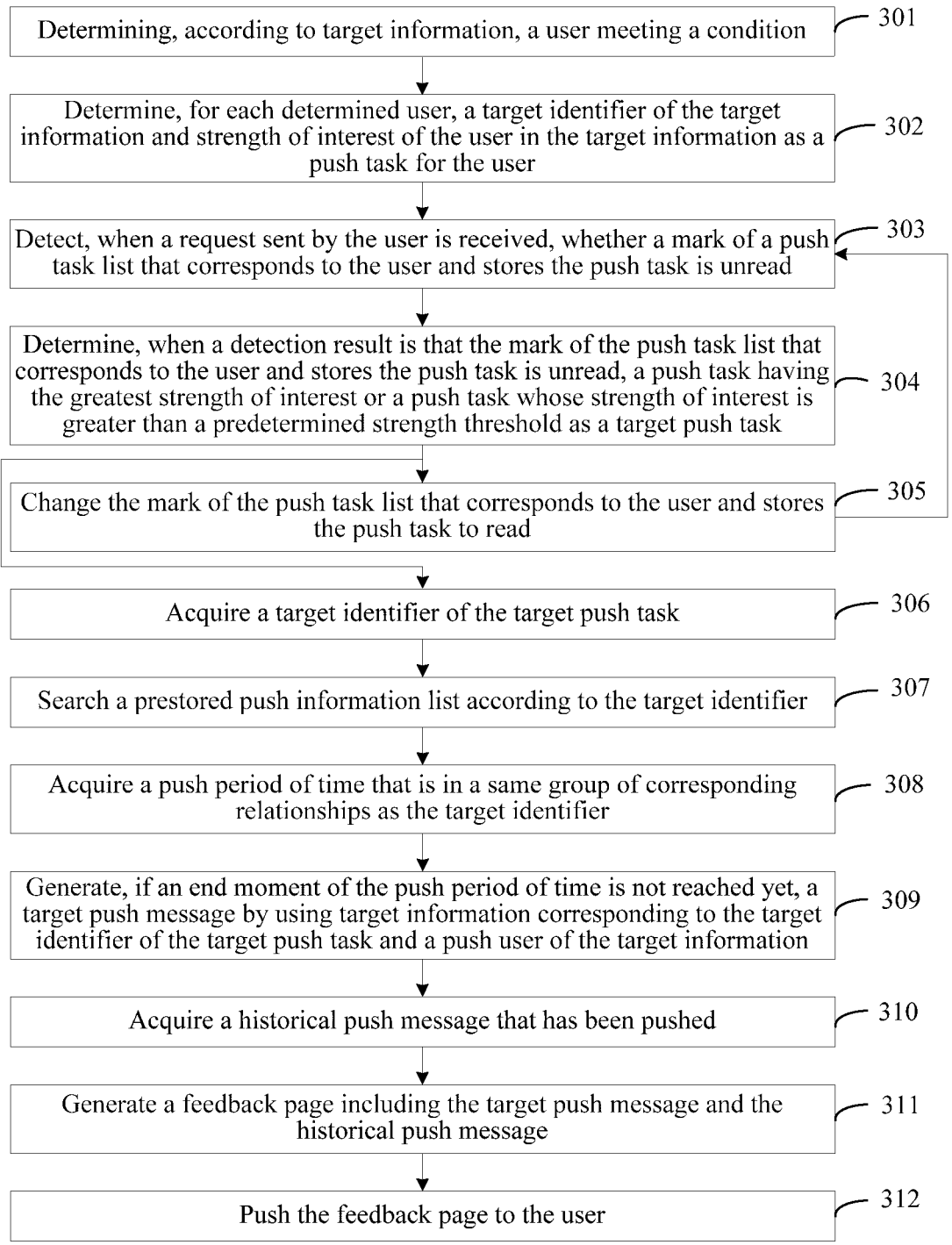
FIG. 3A is a method flowchart of a method for pushing target information according to another embodiment of the present invention.

Referring to FIG. 3A, FIG. 3A is a method flowchart of a method for pushing target information according to an embodiment of the present invention. The method for pushing target information is mainly described by using an example of the server 120 being applied in the implementation environment shown in FIG. 1. The method for pushing target information may include:

301: Determine, according to target information, a user meeting a condition.

The meeting a condition here is that a user has a right to receive target information pushed by a push user. In addition, the meeting a condition may further include that a feature of a user meets a feature of a user required in the target information.

When a user is determined according to target information that needs to be pushed, a user meeting a condition may be determined by using a feature of a user required in the target information and whether a user is a follower of the push user corresponding to the target information.

The pushed target information here may be an advertisement of any commodity, or may also be any content that needs to be pushed, for example, a notification, news, tourist information, weather forecast.

The feature of the user here may include: gender, age, hobby, profession, student, employee, body height, astrological sign, and the like. For example, one piece of target information needs to be pushed to users aged between 20 and 30. For another example, one piece of target information needs to be pushed to students.

It should be noted that target information corresponds to a feature of a user and a push user pushing the target information. The push user may usually be a user that has many followers, for example, a celebrity or a star in a field. For example, when needing to send an advertisement by using a microblog of a star, a commodity manufacturer may negotiate with the star and a microblogging server and inform the microblogging server of a feature of a user corresponding to the advertisement, and correspondingly, the microblogging server saves the advertisement, the feature of the user, and the star user as one task that needs to be pushed.

Therefore, a user list may usually be obtained for each piece of target information that needs to be pushed, and each user in the user list corresponds to the target information.

In a possible implementation manner, the meeting a condition may further be that a feature of a user meets a feature of a user required in target information, the user has a right to receive target information pushed by a push user, and strength of interest of the user in the target information is greater than a predetermined strength threshold. That is, when a user meeting a condition is determined according to target information that needs to be pushed, strength of interest of a user in the target information may further be taken into consideration. If strength of interest is greater than a predetermined strength threshold, it indicates that a user is relatively interested in the target information, and in this case to the target information pushed to the user is of relatively large value.

302: Determine, for each determined user, a target identifier of the target information and strength of interest of the user in the target information as a push task for the user.

After a user is determined, a degree of interest, that is, strength of interest, of each user in the target information may further be determined according to a related algorithm. For example, strength of interest of a user in the target information may be computed according to a feature of a user, interest or hobby of a user, and the like.

In an actual application, for ease of management and push, each user corresponds to one push task list. The push task list includes a push task, and each push task includes a target identifier of target information and strength of interest of the user in the target information, where the target information of the push task is the corresponding target information when the user determined in step 301 meets a condition. The push task list may be shown in Table 1 below:

TABLE 1

| Push task | Target identifier | Strength of interest |
|---|---|---|
| 1 | Target identifier 1 of target information 1 | 0.9 |
| 2 | Target identifier 2 of target information 2 | 0.85 |
| 3 | Target identifier 3 of target information 3 | 0.76 |
| 4 | Target identifier 4 of target information 4 | 0.6 |

303: Detect, when a request sent by a user is received, whether a mark of a push task list that corresponds to the user and stores the push task is unread.

The receiving a request sent from a client or webpage of a user here may be receiving a login request sent by a user account, an acquisition request of acquiring information, an acquisition request of requesting to acquire the target information, or the like. For example, by using a microblogging application as an example, a received request sent by a user account may be: a microblogging login request, an acquisition request for refreshing a microblog, an acquisition request of requesting to acquire a microblogging advertisement, and the like.

After receiving a request sent from a client or a webpage of a user, the server further detects whether the mark of the push task list that corresponds to the user and stores the push task is unread. Generally, every time after receiving a request sent from a client or a webpage of a user, the server determines whether the push task list of the user is unread, and if unread, it indicates that a task in the push task list has not been pushed to the user, and therefore step 304 may be executed. If it is detected that the push task list of the user is read, it indicates that the push task list has been read, and to avoid a case where same push content is continuously sent to the user, step 304 is skipped.

304: Determine, when a detection result is that the mark of the push task list that corresponds to the user and stores the push task is unread, a push task having the greatest strength of interest or a push task whose strength of interest is greater than a predetermined strength threshold as a target push task.

When it is detected that the push task list corresponding to the user is unread, a push task meeting a push condition may be acquired from the push task list, and the push task meeting the push condition is used as the target push task.

For example, a push task having the greatest strength of interest may be acquired from the push task list of the user, and the push task is used as the target push task. For another example, one or more push tasks whose strength of interest are greater than a predetermined strength threshold may be acquired from the push task list of the user, and the one or more push tasks are used as the target push task.

For example, by using Table 1 above as an example, the push task 1 having the greatest strength of interest may be chosen as the target push task; or the push task 1 and the push task 2 whose strength of interest are greater than 0.8 may also be chosen as the target push task.

305: Change the mark of the push task list that corresponds to the user and stores the push task to read.

After the target push task is determined, to avoid interference on the user because the push task list is read again when the user is online the current time, the mark of the push task list corresponding to the user may be changed to read.

306: Acquire a target identifier in the target push task.

After the target push task is determined, the target identifier of the target push task may further be acquired. For example, Table 1 is still used as an example, when it is determined that the target push task is the push task 1, the target identifier 1 of the push task 1 is acquired.

307: Search a prestored push information list according to the target identifier.

The push information list here is for storing at least one group of corresponding relationships, and each group of corresponding relationships include a target identifier, push information, a push user, and a push period of time that are bound.

In an actual application, for ease of management and push of data, the server may further save task data of each piece of target information, and the task data of the target information may include a target identifier, push information, a push user, and a push period of time that are bound, and the task data may be stored as a group of corresponding relationships in the push information list. The push information here is actual pushed content of the target information, and the push period of time is push time negotiated by a promoter and the server.

For the push information list, reference may be further made to Table 2 as follows:

TABLE 2

| Target identifier | Push information | Push user | Push period of time |
|---|---|---|---|
| Target identifier 1 | Push information 1 | Push user 1 | 15:00-15:30 |
| Target identifier 2 | Push information 2 | Push user 2 | 16:00-17:50 |
| Target identifier 3 | Push information 3 | Push user 3 | 10:00-10:30 |
| Target identifier 4 | Push information 4 | Push user 4 | 11:30-13:30 |

It further needs to be noted that for each piece of target information, the push information list stores task data corresponding to the target information, and therefore as long as the target identifier of the target information is determined, push information, a push user, and a push period of time corresponding to the target information may be found according to the push information list.

308: Acquire a push period of time that is in a same group of corresponding relationships as the target identifier.

Acquire, from the push information list, a push period of time that is in a same group of corresponding relationships as the target identifier. For example, when the target identifier is the target identifier 2, the push information list may be searched according to the target identifier 2, and it is found that a push period of time corresponding to the target identifier 2 is 16:00-17:50.

In an actual application, before target information is pushed, a feedback page is formed, and the feedback page includes pushed information and common information. For some target information that has been pushed, because the target information may still be in a push period of time, to increase the strength of recommendation, the target information may further be pushed together with content corresponding to a latest target push task. Reference may be made to step 309 to step 312 for details.

309: Generate, if an end moment of the push period of time is not reached yet, a target push message by using target information corresponding to the target identifier of the target push task and a push user of the target information.

In an actual application, the push information list may be searched, and the target information corresponding to the target identifier of the target push task and the push user corresponding to the target information are found from the push information list, and the target push message is then generated by using the found target information and push user.

310: Acquire a historical push message that has been pushed.

If at this time an end moment of the push period of time corresponding to the target push task is not reached yet, it indicates that the target information corresponding to the target push task may still be pushed.

For example, when it is determined that the push period of time is 16:00 to 17:50 on March 17, and the moment is 16:28 on March 17, in this case, a condition of the push period of time is met, and therefore, the target information corresponding to the push period of time may be pushed.

The historical push message here is a push message that has been pushed, and the push message may include the target information and the push user pushing the target information.

In an actual application, the historical push message may be saved in a historical message storage space. When the historical push message needs to be acquired, the historical push message may be acquired from the historical message storage space. When a historical push message that has been pushed is acquired here, a historical push message that meets a condition of being pushed again may be acquired, and the condition of being pushed may include one of that the push period of time is still valid and that strength of interest is the greatest or strength of interest is greater than a predetermined strength threshold.

311: Generate a feedback page including the target push message and the historical push message.

The target push message here may include the target information corresponding to the target identifier of the target push task and the push user pushing the target information.

Usually, the generated feedback page includes a common message that the user requests to acquire, or may further include the target push message and the historical push message. The common message here is a message that is not processed by the server and posted by another user followed by the user.

Figure 3B:
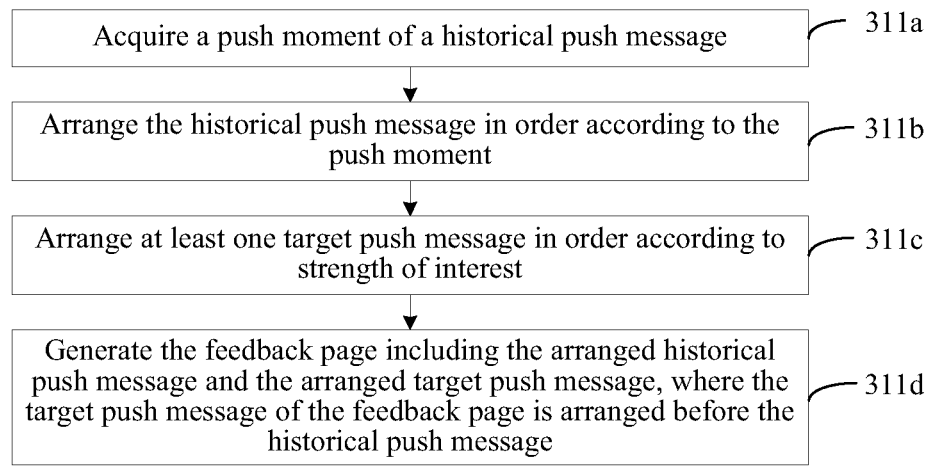
FIG. 3B is a schematic flowchart of generating a feedback page according to an embodiment of the present invention.

Referring to FIG. 3B, FIG. 3B is a schematic flowchart of generating a feedback page according to an embodiment of the present invention. When the feedback page including the target push message and the historical push message is generated, the following steps may be included:

311a: Acquire a push moment of the historical push message.

Generally, the historical push message is a push message pushed to a client or a webpage of the user when a request sent from the client or the webpage is received previously; correspondingly, each historical push message corresponds to one push moment when being pushed, and when the historical push message is saved after being pushed, the push moment of the historical push message is saved at the same time.

311b: Arrange the historical push message in order according to the push moment.

311c: Arrange at least one target push message in order according to strength of interest.

When multiple target push messages exist, the multiple target push messages may be arranged in order according to strength of interest of each target push message.

311d: Generate a feedback page including the arranged historical push message and the arranged target push message, and the target push message of the feedback page is arranged before the historical push message.

That is, the generated feedback page may include the arranged historical push message and the arranged target push message, and the target push message is usually arranged before the historical push message. In this way, the user can more easily see the target push message arranged in the front and the historical push message arranged in the front. Obviously, on the generated feedback page, the feedback page usually further includes a common message, that is, a message posted by another user followed by the user, that is, these target push message, historical push message, and common message are arranged according to a timeline to form the feedback page.

Figure 3C:
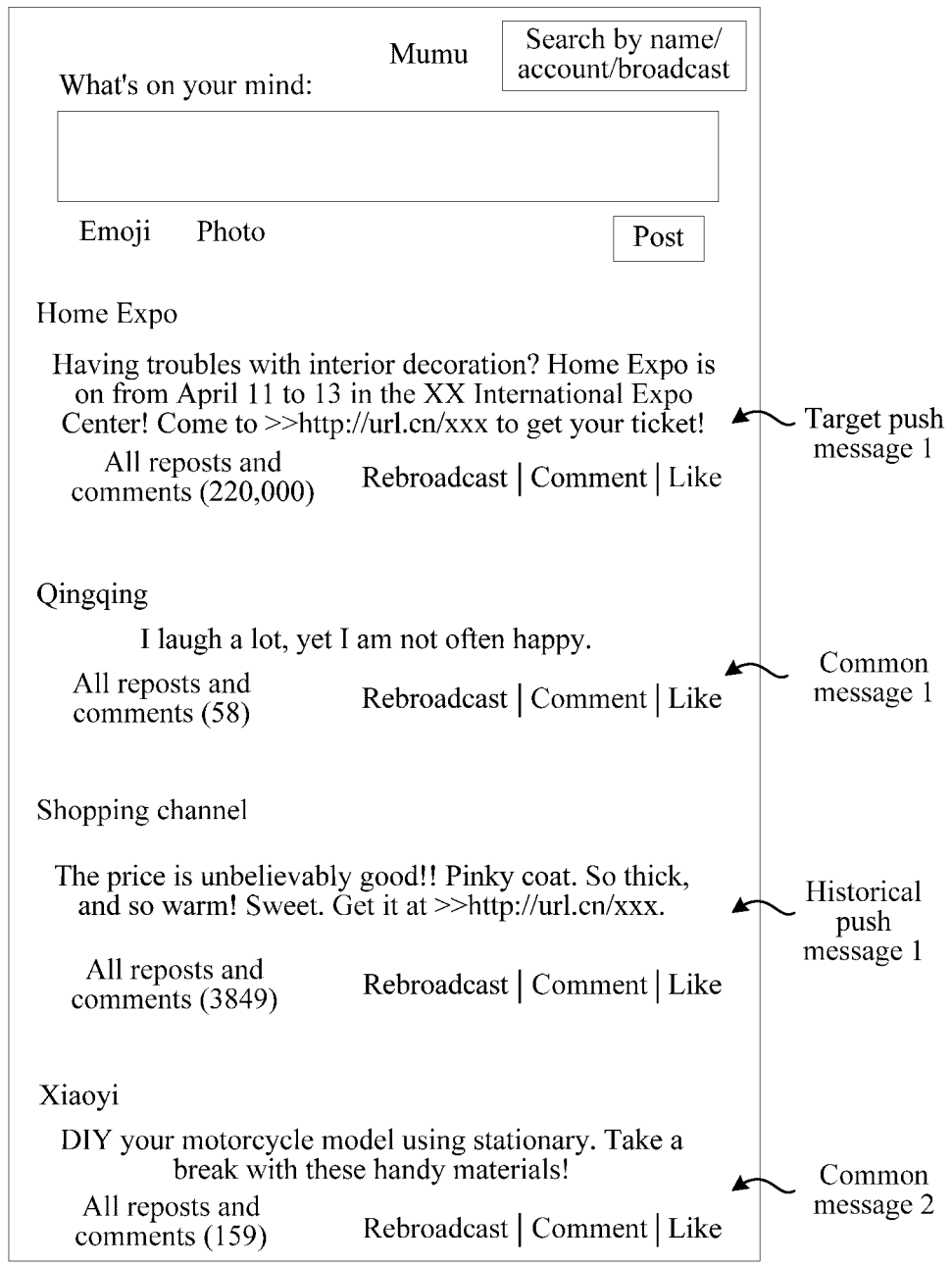
FIG. 3C is a schematic diagram of a generated feedback page according to an embodiment of the present invention.

For example, referring to FIG. 3C, FIG. 3C is a schematic diagram of a generated feedback page according to an embodiment of the present invention. The username is "Mumu", the feedback page includes a target push message 1 pushed by a push user "Home Expo", a historical push message 1 pushed by a push user "shopping channel", a common message 1 posted by a user "Qingqing", and a common message 2 posted by a user "Xiaoyi".

312: Push the feedback page to the user.

After the feedback page is generated, the generated feedback page is pushed to the client or webpage of the user. The client may be a client run on any terminal 140 in the implementation environment shown in FIG. 1, or the webpage may be a webpage displayed on any terminal 140 in the implementation environment shown in FIG. 1.

Generally, after the target push message is pushed to the user, the server deletes the push task corresponding to the target push message, and may determine the target push message as a historical push message. That is, the push task corresponding to the target push message that has been pushed is no longer a candidate in a next time of acquisition of a target push task.

In conclusion, in the method for pushing target information provided in the embodiment of the present invention, in a push to a user, a target push task is determined according to strength of interest of the user in a push task, a target push message is determined according to the target push task, and the target push message is pushed to the user; a problem of insufficiently high push quality of pushing target information in existing technologies is solved; during acquisition of the target push task, according to strength of interest of the user, the target push task having the greatest strength of interest or having strength of interest greater than a predetermined strength threshold may be selected; therefore, a push amount is significantly reduced, it is ensured that a push message pushed to the user is content in which the user is relatively interested, and an effect of improving push quality is achieved.

It further needs to be noted that, the steps above may be implemented by a module in a server, or may also be implemented by multiple modules, and the foregoing step may be combined in any possible way to form different embodiments.

An apparatus embodiment of the present invention is provided below, and for details that are not described, reference may be made to the corresponding method embodiment in the foregoing.

Figure 4:
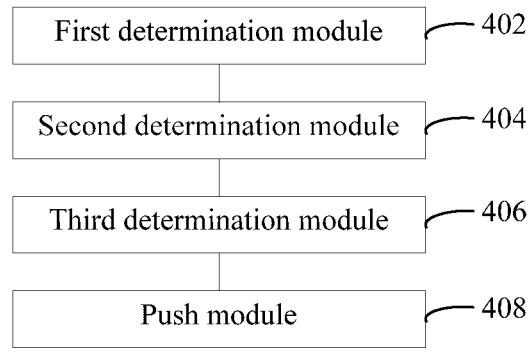
FIG. 4 is a schematic structural diagram of an apparatus for pushing target information according to an embodiment of the present invention.

Referring to FIG. 4, FIG. 4 is a schematic structural diagram of an apparatus for pushing target information according to an embodiment of the present invention. The apparatus for pushing target information is mainly described by using an example of the server 120 being applied in the implementation environment shown in FIG. 1. The server 120 includes one or more processors, a memory, and one or more program modules constituting the apparatus for pushing target information. The one or more program modules are stored in the memory, and are executed by the one or more processors to implement a method for pushing target information. The multiple program modules include: a first determination module 402, a second determination module 404, a third determination module 406, and a push module 408.

The first determination module 402 may be configured to determine, according to target information, a user meeting a condition, where a user has a right to receive target information pushed by a push user.

The second determination module 404 may be configured to determine, for each determined user, a target identifier of the target information and strength of interest of the user in the target information as a push task for the user.

The third determination module 406 may be configured to determine a push task having the greatest strength of interest or a push task whose strength of interest is greater than a predetermined strength threshold as a target push task;

The push module 408 may be configured to push a target push message corresponding to the target push task to the user, where the target push message includes target information corresponding to the target identifier of the target push task and the push user pushing the target information.

In conclusion, in the apparatus for pushing target information provided in the embodiment of the present invention, in a push to a user, a target push task is determined according to strength of interest of the user in a push task, a target push message is determined according to the target push task, and the target push message is pushed to the user; a problem of insufficiently high push quality of pushing target information in existing technologies is solved; during acquisition of the target push task, according to strength of interest of the user, the target push task having the greatest strength of interest or having strength of interest greater than a predetermined strength threshold may be selected; therefore, a push amount is significantly reduced, it is ensured that a push message pushed to the user is content in which the user is relatively interested, and an effect of improving push quality is achieved.

Figure 5:
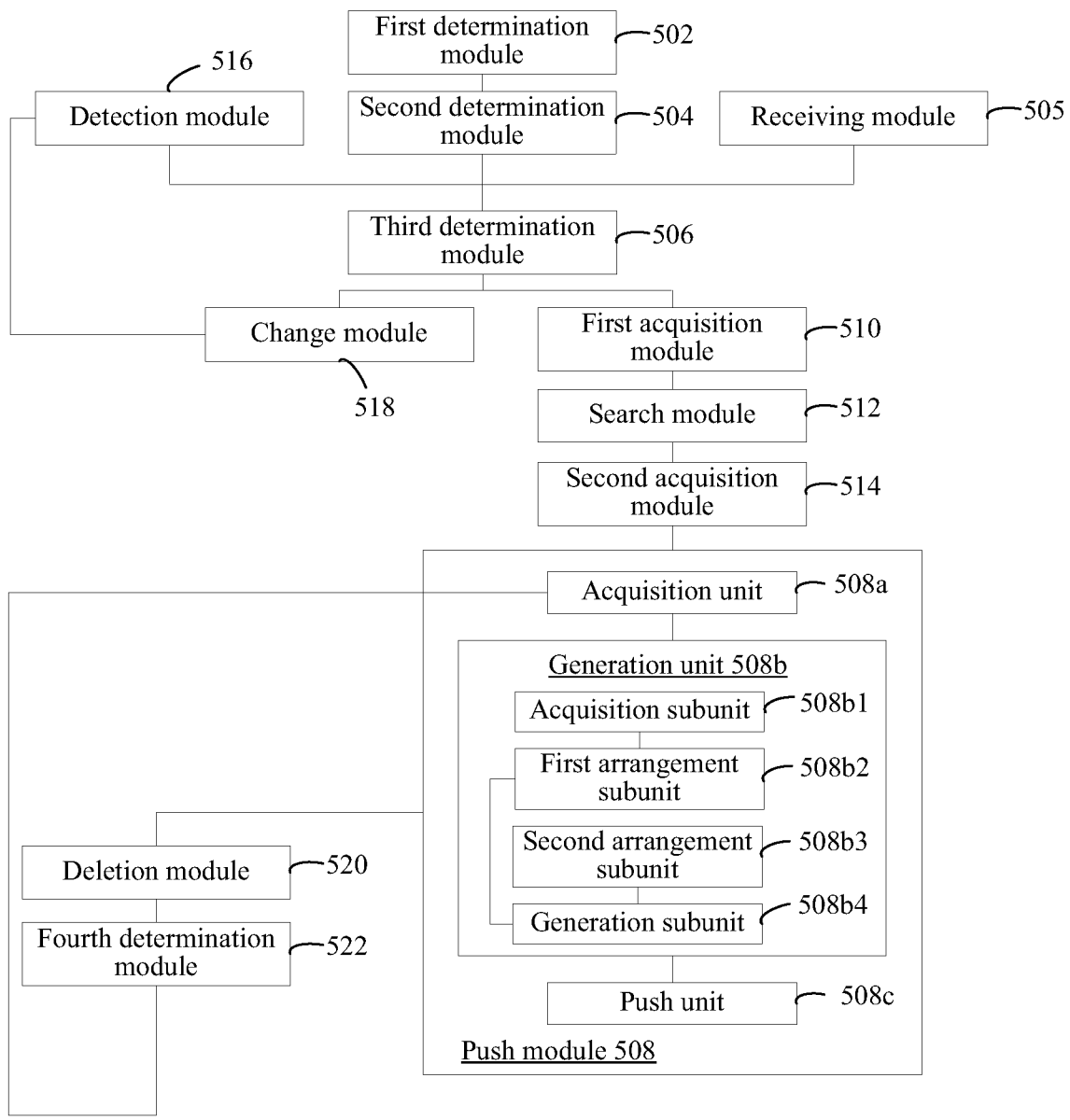
FIG. 5 is a schematic structural diagram of an apparatus for pushing target information according to another embodiment of the present invention.

Referring to FIG. 5, FIG. 5 is a schematic structural diagram of an apparatus for pushing target information according to another embodiment of the present invention. The apparatus for pushing target information is mainly described by using an example of the server 120 being applied in the implementation environment shown in FIG. 1. The server 120 includes one or more processors, a memory, and one or more program modules constituting the apparatus for pushing target information. The one or more program modules are stored in the memory, and are executed by the one or more processors to implement a method for pushing target information. The multiple program modules include: a first determination module 502, a second determination module 504, a third determination module 506, and a push module 508.

The first determination module 502 may be configured to determine, according to target information, a user meeting a condition, where a user has a right to receive target information pushed by a push user.

The second determination module 504 may be configured to determine, for each determined user, a target identifier of the target information and strength of interest of the user in the target information as a push task for the user.

The third determination module 506 may be configured to determine a push task having the greatest strength of interest or a push task whose strength of interest is greater than a predetermined strength threshold as a target push task.

The push module 508 may be configured to push a target push message corresponding to the target push task to the user, where the target push message includes target information corresponding to a target identifier of the target push task and the push user pushing the target information.

In a first possible implementation manner of the embodiment shown in FIG. 5, the push module 508 may include: an acquisition unit 508a, a generation unit 508b, and a push unit 508c.

The acquisition unit 508a may be configured to acquire a historical push message that has been pushed.

The generation unit 508b may be configured to generate a feedback page including the target push message and the historical push message.

The push unit 508c may be configured to push the feedback page to the user.

In a second possible implementation manner of the embodiment shown in FIG. 5, the generation unit 508b may include: an acquisition subunit 508b1, a first arrangement subunit 508b2, a second arrangement subunit 508b3, and a generation subunit 508b4.

The acquisition subunit 508b1 may be configured to acquire a push moment of a historical push message.

The first arrangement subunit 508b2 may be configured to arrange the historical push message in order according to the push moment.

The second arrangement subunit 508b3 may be configured to arrange at least one target push message in order according to strength of interest.

The generation subunit 508b4 may be configured to generate the feedback page including the arranged historical push message and the arranged target push message, where the target push message of the feedback page is arranged before the historical push message.

In a third possible implementation manner of the embodiment shown in FIG. 5, the apparatus for pushing target information may further include: a deletion module 520 and a fourth determination module 522.

The deletion module 520 may be configured to delete the target push task corresponding to the target push message.

The fourth determination module 522 may be configured to determine the target push message as a historical push message.

In a fourth possible implementation manner of the embodiment shown in FIG. 5, the apparatus for pushing target information may further include: a receiving module 505.

The receiving module 505 may be configured to receive a request sent by the user.

In a fifth possible implementation manner of the embodiment shown in FIG. 5, the apparatus for pushing target information may further include: a first acquisition module 510, a search module 512, and a second acquisition module 514.

The first acquisition module 510 may be configured to acquire the target identifier of the target push task.

The search module 512 may be configured to search a prestored push information list according to the target identifier acquired by the first acquisition module 510, where the push information list stores at least one group of corresponding relationships, and each group of corresponding relationships include a target identifier, push information, a push user, and a push period of time that are bound.

The second acquisition module 514 may be configured to acquire a push period of time that is in a same group of corresponding relationships as the target identifier.

The push module 508 may be further configured to push, when an end moment of the push period of time is not reached yet, the target push message corresponding to the target push task to a client of the user.

In a sixth possible implementation manner of the embodiment shown in FIG. 5, the apparatus for pushing target information may further include: a detection module 516.

The detection module 516 may be configured to detect whether a mark of a push task list that corresponds to the user and stores the push task is unread.

The third determination module 506 may be further configured to determine, when a detection result of the detection module 516 is that the mark of the push task list that corresponds to the user and stores the push task is unread, the target push task of the user.

The apparatus for pushing target information may further include: a change module 518.

The change module 518 may be configured to change the mark of the push task list that corresponds to the user and stores the push task to read.

In conclusion, in the apparatus for pushing target information provided in the embodiment of the present invention, in a push to a user, a target push task is determined according to strength of interest of the user in a push task, a target push message is determined according to the target push task, and the target push message is pushed to the user; a problem of insufficiently high push quality of pushing target information in existing technologies is solved; during acquisition of the target push task, according to strength of interest of the user, the target push task having the greatest strength of interest or having strength of interest greater than a predetermined strength threshold may be selected; therefore, a push amount is significantly reduced, it is ensured that a push message pushed to the user is content in which the user is relatively interested, and an effect of improving push quality is achieved.

It should be noted that when the apparatus for pushing target information provided in the foregoing embodiments pushes target information, the foregoing division of functional modules is only used as an example for description. In practical applications, the foregoing functions may be allocated to be accomplished by different functional modules according to needs, that is, the internal structure of the server is divided into different functional modules to accomplish all or some of the functions described above. In addition, the apparatus for pushing target information provided in the foregoing embodiments share the same concept with the embodiments of the method for pushing target information, and reference may be made to the method embodiments for the specific implementation process of the apparatus, which is no longer elaborated herein.

The sequence numbers of the above embodiments of the present invention are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present invention. Any modification, equivalent replacement, or improvement made within the spirit and principle of the present invention shall fall within the protection scope of the present invention.

What is claimed is:

1. A method for pushing target information, run on a server, the server comprising one or more processors and a memory storing a program module, the program module being executed by the one or more processors, and the method comprising:

determining, according to target information, users who meets a condition, the users having rights to receive the target information pushed by a push user;

determining, for each user determined, a target identifier of the target information and strength of interest of the user in the target information as a push task for the user;

determining a push task having the greatest strength of interest or a push task whose strength of interest is greater than a predetermined strength threshold as a target push task; and pushing a target push message corresponding to the target push task to the user, the target push message comprising target information corresponding to a target identifier of the target push task and the push user pushing the target information, wherein the pushing the target push message corresponding to the target push task to the user comprises:

acquiring a first historical push message that has been pushed previously to the user as a first previous target push message;

determining that the first historical push message meets a condition of being pushed again by the push user, the determining comprising determining that a push period of time for the first historical push message is still valid and determining that a strength of interest of the user in the information of the first historical push message is at least one of the greatest or is greater than the predetermined strength threshold;

acquiring a second historical push message that has been pushed previously to the user as a second previous target push message;

determining that the second historical push message does not meet a condition of being pushed again by the push user, the determining comprising at least one of determining that a push period of time for the second historical push message is no longer valid or determining that a strength of interest of the user in the information of the second historical push message is less than the predetermined strength threshold;

acquiring at least one normal message, wherein the at least one normal message is posted by at least one other user that is followed by the user;

generating a feedback page comprising the target push message and the at least one normal message, wherein the feedback page further comprises the first historical push message in response to the first historical push message meeting the condition of being pushed again, and wherein the feedback page is absent the second historical push message in response to the second historical push message failing to meet the condition of being pushed again, wherein generating the feedback page further comprises:

arranging the at least one normal message on the feedback page according to a timeline corresponding to a time when the at least one normal message was posted by the at least one other user;

acquiring a push moment of the first historical push message, the push moment comprising a time when the first historical push message was pushed previously to the user as a previous target push message;

arranging the first historical push message relative to the at least one normal message in the timeline on the feedback page according to the push moment relative to the time when the at least one normal message was posted;

arranging the at least one target push message before the first historical push message in the timeline on the feedback page according to a present time relative to the push moment of the first historical push message and relative to the time when the at least one normal message was posted; and suppressing a display of the second historical push message within the timeline of the feedback page; and pushing the feedback page to a terminal device of the user.

2. The method according to claim 1, wherein the generating a feedback page comprising the target push message and the first historical push message comprises:

arranging at least one target push message in order according to strength of interest.

3. The method according to claim 1, after the pushing a target push message corresponding to the target push task to the user, further comprising:

deleting the push task corresponding to the target push message; and determining the target push message as a historical push message.

4. The method according to claim 1, before the determining a push task having the greatest strength of interest or a push task whose strength of interest is greater than a predetermined strength threshold as a target push task, further comprising:

receiving a request sent by the user.

5. The method according to claim 1, before the pushing a target push message corresponding to the target push task to the user, further comprising:

acquiring the target identifier of the target push task;

searching a prestored push information list according to the target identifier, the push information list storing at least one group of corresponding relationships, and each group of corresponding relationships comprise a target identifier, push information, a push user, and a push period of time for the target identifier that are bound;

acquiring a push period of time for the target identifier that is in a same group of corresponding relationships as the target identifier; and executing, if an end moment of the push period of time for the target identifier is not reached yet, the step of pushing a target push message corresponding to the target push task to the user.

6. The method according to claim 5, before the determining a push task having the greatest strength of interest or a push task whose strength of interest is greater than a predetermined strength threshold as a target push task, further comprising:

detecting whether a mark of a push task list that corresponds to the user and stores the push task is unread;

executing, when a detection result is that the mark of the push task list that corresponds to the user and stores the push task is unread, the step of determining the target push task of the user; and after the determining a push task having the greatest strength of interest or a push task whose strength of interest is greater than a predetermined strength threshold as a target push task, further comprising:

changing the mark of the push task list that corresponds to the user and stores the push task to read.

7. The method according to claim 1, wherein a push task list includes at least one push task, and each push task corresponds to a target identifier of target information and strength of interest of the user in the target information.

8. A server, wherein the server comprises:

one or more processors;

a memory;

one or more program modules, stored in the memory, and being executed by the one or more processors, the one or more program modules comprising:

a first determination module, configured to determine, according to target information, users meeting a condition, the users having rights to receive the target information pushed by a push user;

a second determination module, configured to determine, for each user determined, a target identifier of the target information and strength of interest of the user in the target information as a push task for the user;

a third determination module, configured to determine a push task having the greatest strength of interest or a push task whose strength of interest is greater than a predetermined strength threshold as a target push task; and a push module, configured to push a target push message corresponding to the target push task to the user, the target push message comprising target information corresponding to a target identifier of the target push task and the push user pushing the target information wherein the push module comprises:

an acquisition unit, configured to:

acquire a first historical push message that has been pushed previously to the user as a previous target push message, and acquire at least one normal message, wherein the at least one normal message is posted by at least one other user that is followed by the user; and determine that the first historical push message meets a condition of being pushed again by the push user, the determining comprising determining that a push period of time for the first historical push message is still valid and determining that a strength of interest of the user in the information of the first historical push message is at least one of the greatest or is greater than the predetermined strength threshold;

acquire a second historical push message that has been pushed previously to the user as a second previous target push message;

determine that the second historical push message does not meet a condition of being pushed again by the push user, the determining comprising at least one of determining that a push period of time for the second historical push message is no longer valid or determining that a strength of interest of the user in the information of the second historical push message is less than the predetermined strength threshold;

a generation unit, configured to generate a feedback page comprising the target push message and the at least one normal message, wherein the feedback page further comprises the first historical push message in response to the first historical push message meeting the condition of being pushed again, and wherein the feedback page is absent the second historical push message in response to the second historical push message failing to meet the condition of being pushed again, wherein the generation unit comprises:

an acquisition subunit, configured to acquire a push moment of the first historical push message, the push moment comprising a time when the first historical push message was pushed previously to the user as a previous target push message;

a first arrangement subunit, configured to:
arrange the at least one normal message on the feedback page according to a timeline corresponding to a time when the at least one normal message was posted by the at least one other user; and
arrange the first historical push message relative to the at least one normal message in the timeline on the feedback page according to the push moment relative to the time when the at least one normal message was posted;

a generation subunit, configured to generate the feedback page comprising the first historical push message, the at least one normal message, and the target push message, the target push message being arranged before the first historical push message in the timeline on the feedback page according to a present time relative to the push moment of the first historical push message and relative to the time when the at least one normal message was posted, the generation subunit further configured to suppress a display of the second historical push message within the timeline of the feedback page;

and a push unit, configured to push the feedback page to a terminal device of the user.

9. The server according to claim 8, wherein the generation unit comprises:
a second arrangement subunit, configured to arrange at least one target push message in order according to strength of interest.

10. The server according to claim 8, further comprising:
a deletion module, configured to delete the target push task corresponding to the target push message; and
a fourth determination module, configured to determine the target push message as a historical push message.

11. The server according to claim 8, further comprising:
a receiving module, configured to receive a request sent by the user.

12. The server according to claim 8, further comprising:
a first acquisition module, configured to acquire the target identifier of the target push task;
a search module, configured to search a prestored push information list according to the target identifier acquired by the first acquisition module, the push information list storing at least one group of corresponding relationships, each group of corresponding relationships comprise a target identifier, push information, a push user, and a push period of time for the target identifier that are bound; and
a second acquisition module, configured to acquire a push period of time for the target identifier that is in a same group of corresponding relationships as the target identifier;
wherein the push module is further configured to push, when an end moment of the push period of time for the target identifier is not reached yet, push the target push message corresponding to the target push task to the user.

13. The server according to claim 12, further comprising:
a detection module, configured to detect whether a mark of a push task list that corresponds to the user and stores the push task is unread;
wherein the third determination module is further configured to determine, when a detection result of the detection module is that the mark of the push task list that corresponds to the user and stores the push task is unread, the target push task of the user.

14. The server according to claim 13, further comprising:
a change module, configured to change the mark of the push task list that corresponds to the user and stores the push task to read.

15. The server according to claim 8, wherein a push task list includes at least one push task, and each push task corresponds to a target identifier of target information and strength of interest of the user in the target information.

16. A non-transitory computer readable store medium, stored with computer executable instructions thereon, these executable instructions, when being run on a server, executing a method for pushing target information, and the method comprising:
determining, according to target information, users meeting a condition, the users having rights to receive the target information pushed by a push user;
determining, for each user determined, a target identifier of the target information and strength of interest of the user in the target information as a push task for the user;
determining a push task having the greatest strength of interest or a push task whose strength of interest is greater than a predetermined strength threshold as a target push task; and
pushing a target push message corresponding to the target push task to the user, the target push message comprising target information corresponding to a target identifier of the target push task and the push user pushing the target information,
wherein the pushing a target push message corresponding to the target push task to the user comprises:
acquiring a first historical push message that has been pushed previously to the user as a previous target push message;
determining that the first historical push message meets a condition of being pushed again by the push user, the determining comprising determining that a push period of time for the first historical push message is still valid and determining that a strength of interest of the user in the information of the first historical push message is at least one of the greatest or is greater than the predetermined strength threshold;

acquiring a second historical push message that has been pushed previously to the user as a second previous target push message;

determining that the second historical push message does not meet a condition of being pushed again by the push user, the determining comprising at least one of determining that a push period of time for the second historical push message is no longer valid or determining that a strength of interest of the user in the information of the second historical push message is less than the predetermined strength threshold;

acquiring at least one normal message, wherein the at least one normal message is posted by at least one other user that is followed by the user;

generating a feedback page comprising the target push message and the at least one normal message, wherein the feedback page further comprises the first historical push message in response to the first historical push message meeting the condition of being pushed again, and wherein the feedback page is absent the second historical push message in response to the second historical push message failing to meet the condition of being pushed again, wherein generating the feedback page further comprises:

arranging the at least one normal message on the feedback page according to a timeline corresponding to a time when the at least one normal message was posted by the at least one other user;

acquiring a push moment of the first historical push message, the push moment comprising a time when the first historical push message was pushed previously to the user as a previous target push message;

arranging the first historical push message relative to the at least one normal message in the timeline on the feedback page according to the push moment relative to the time when the at least one normal message was posted;

arranging the at least one target push message before the first historical push message in the timeline on the feedback page according to a present time relative to the push moment of the first historical push message and relative to the time when the at least one normal message was posted; and suppressing a display of the second historical push message within the timeline of the feedback page; and pushing the feedback page to a terminal device of the user.

17. The non-transitory computer readable store medium according to claim 16, wherein a push task list includes at least one push task, and each push task corresponds to a target identifier of target information and strength of interest of the user in the target information.

* * * * *